July 20, 1937.

W. H. BATH 2,087,727

CENTRIFUGAL MACHINE

Filed Dec. 8, 1933

2 Sheets-Sheet 1

INVENTOR.
WILMER H. BATH
BY Maurice A. Crews
ATTORNEY.

July 20, 1937.  W. H. BATH  2,087,727
CENTRIFUGAL MACHINE
Filed Dec. 8, 1933    2 Sheets-Sheet 2

INVENTOR.
WILMER H. BATH
BY Maurice A. Crews
ATTORNEY.

Patented July 20, 1937

2,087,727

UNITED STATES PATENT OFFICE 2,087,727

CENTRIFUGAL MACHINE

Wilmer Hiestand Bath, West Conshohocken, Pa. assignor to The Sharples Specialty Company, Philadelphia, Pa., a corporation of Delaware Application December 8, 1933, Serial No. 701,443

2 Claims. (Cl. 233—20)

The present invention pertains to the art of the centrifugal treatment of fluid substances. It is particularly concerned with improvements in the class of centrifugal machines in which a concentration of suspended solid material within a liquid occurs during the feed of a suspension of solids in liquid to the rotor of the machine and the concentrated suspension is discharged thereafter intermittently from the machine by breaking the connection between two normally abutting portions of the machine to afford a discharge outlet for the suspension.

A centrifugal separator of this general type is disclosed in the patent to Nyrop No. 1,735,692 and the present invention was conceived as the solution of problems encountered in the application to commercial uses of machines of the general type of those forming the subject matter of the Nyrop patent. In the embodiment of the Nyrop invention illustrated in Figure 3 of the patent drawings, a centrifugal rotor is illustrated which is formed in two parts which are axially separable to afford provision for intermittent peripheral discharge of a concentrated effluent from the rotor. In the use of a machine of this type it is necessary, in order to preclude leakage, to provide a sealing member between the abutting axially separable portions which control the intermittent discharge. Such sealing members are subjected to very severe erosive effects by reason of the impingement of material thereagainst incident to its discharge, however, and sealing members applied to this use have, in many cases, required replacement after a few hours use. Such replacement not only involves the expense of replacement of the worn sealing member and labor costs of installation of a new part, but it also entails incidental inconvenience and loss caused by frequent interruption of the operation of the machine.

It has accordingly been the object of the present invention to avoid these defects of the prior art by the provision in such a machine of a sealing member and coacting bowl parts adapted to afford much greater durability of the sealing member both by reason of improvements in the construction of this member itself and because of alterations in coacting parts which preclude the flow of material across this member in such a direction as to cause rapid erosion of the improved sealing surface.

Figure 2:
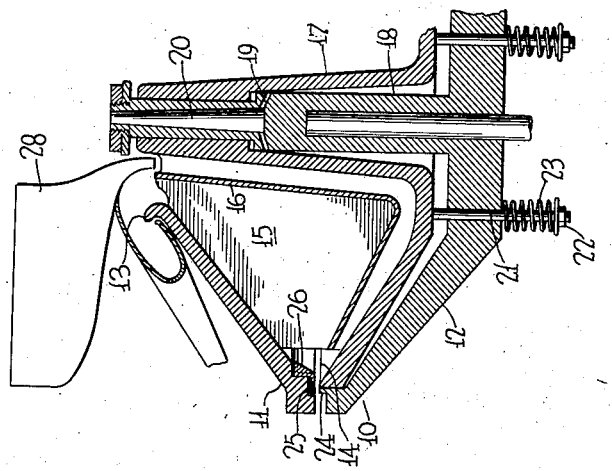
Figure 1:
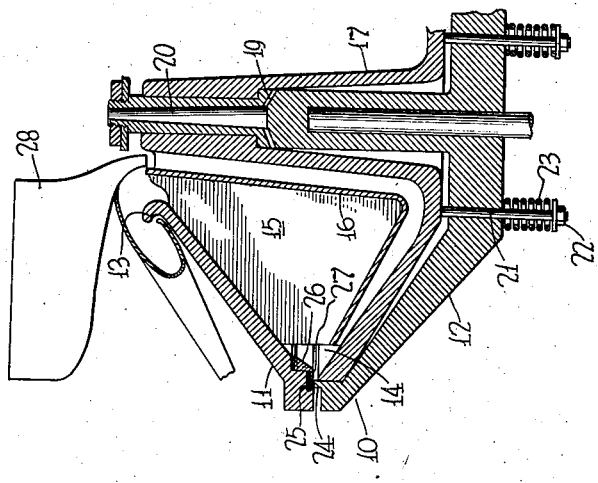
Figure 3:
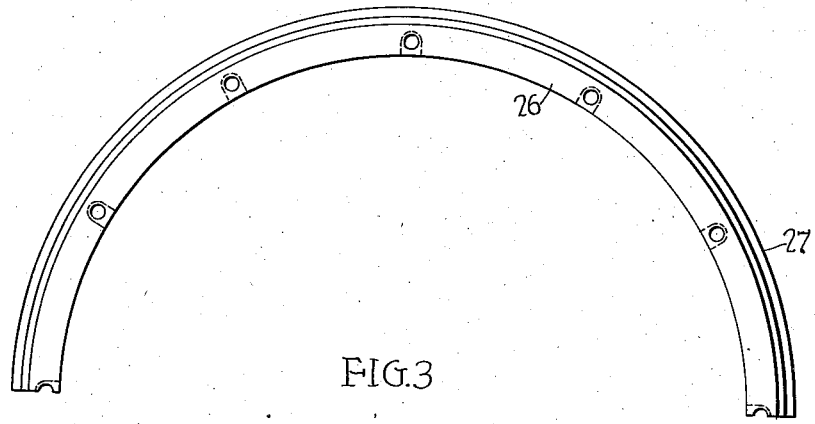
Figure 4:
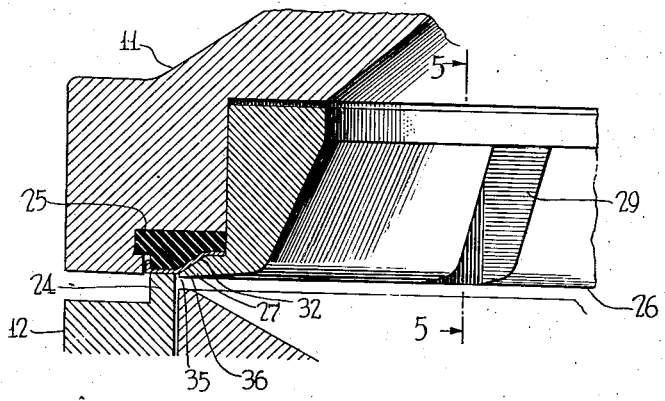
Figures 5, 6:
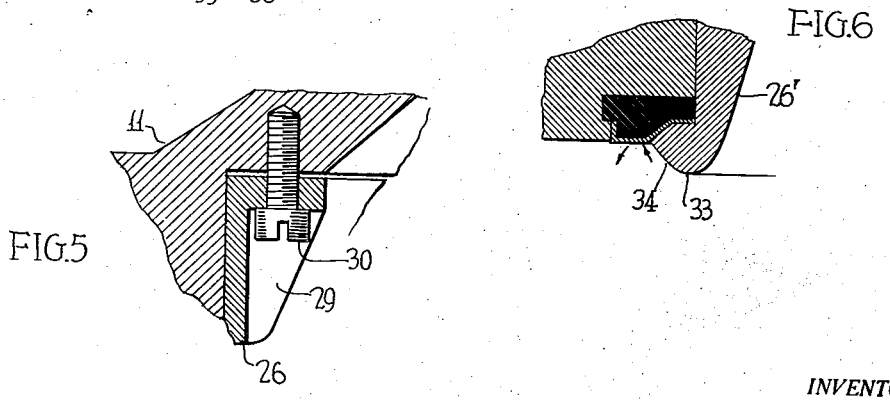

Further objects of the invention and the manner in which they have been attained will be in part pointed out hereinafter and in part obvious from a reading of the subjoined specification in the light of the attached drawings, in which Figure 1 is a central longitudinal section through the rotor and related parts of a machine constructed in accordance with the invention, showing the rotor parts in closed position, Figure 2 is a view similar to Figure 1, showing the rotor parts in partially opened position, Figure 3 is a plan view of a clamping member, Figure 4 is an enlarged detailed vertical cross section of coacting rotor parts in closed position, Figure 5 is a cross-sectional view on the line 5—5 of Figure 4, and Figure 6 is a detailed cross section of a modified arrangement for holding the sealing member in place.

Referring to the drawings by reference characters, the numeral 10 indicates the rotor of a centrifugal separator embodying the features of the invention. The rotor is formed in two complementary parts 11 and 12 which are held in abutting relationship during the major portion of the operating cycle of the machine and define between them a chamber from which liquid is adapted to be discharged over the lips 13 during the accumulation of a concentrated suspension in the outer circumferential zone 14. Members adapted to effect feed of a suspension to the separating chamber of the rotor and acceleration of the suspension to rotor speed form a rigid part of the upper part of the rotor and comprise accelerator plates 15 rigidly secured to the rotor part 11 and to an annular member 16 through which material is adapted to be fed to the separating chamber of the rotor. A second feed directing member 17 is secured to the member 16 and surrounds an upwardly extending hub 18 upon the lower member 12 of the rotor and is spaced from the member 16, the members 16 and 17 defining feed channels through which material may be fed to the outer circumferential zone of the separating chamber.

The hub 18 of the rotor is provided with openings 19 and a feed channel 20 through which liquid may be fed to the axially and radially extending space between the rotor proper and the member 17 for the purpose of effecting relative axial movement of the rotor parts 11 and 12 to permit discharge of concentrated effluent. The rotor parts are secured together by means of bolts 21 extending from the base of the member 17 which is rigidly secured to the upper part of the bowl. Nuts 22 are secured to the bolts 21 and springs 23 are held under compression between the nuts 22 and the base of the bowl part 12.

The lower part 12 of the bowl is provided with a sealing member in the form of an annular flange 24 which normally abuts a complemental flexible sealing member 25. The flexible sealing member 25 is secured in position by an annular clamping ring 26 which is provided with a clamping flange 27 overlying a portion of the sealing member 25.

In the operation of such a machine, the rotor is rotated during the feed of a suspension of solids in liquid thereto from a source of supply 28 through the feed channels defined by the members 16 and 17, the bowl parts 11 and 12 being maintained in abutting and sealed relationship during this stage of the cycle of operations. In connection with such operation, a concentrated suspension will accumulate in the outer circumferential zone of the separating chamber defined by the parts 11 and 12 and a lighter liquid effluent will be discharged over the lip 13 from the machine.

After the concentration of material has taken place for a controlled period, the feed of suspended material is discontinued and liquid is admitted through the channel 20 to the space between the members 12 and 17. The action of centrifugal force upon this liquid caused by continued rotation of the rotor operates to cause separation of members 12 and 17 in opposition to the counteracting pressure exerted by the springs 23, the part 11 being moved relatively to the part 12 through the position of Figure 2. When the rotor parts are moved apart in this manner, the action of centrifugal force upon the concentrated material in the outer circumferential portion of the separating chamber operates to effect discharge of this material. After the concentrated material has been discharged in this manner the feed of actuating liquid is discontinued and residual actuating liquid is discharged from the space between the members 12 and 17 through peripheral openings, (not shown), as described in the above-identified Nyrop patent. Upon discharge of such liquid, the resilience of the springs 23 urges the rotor parts into sealed relationship and the feed of suspended material is resumed and the cycle of operations repeated.

Considerable difficulty has been encountered in connection with attempts to maintain an adequate sealing arrangement in connection with machines of this character and a special type of sealing arrangement is accordingly provided. In accordance with the invention the flexible or resilient sealing member 25 consists of a backing member, which may be formed of rubber or other material having the necessary flexibility and resilience, and a wear-resistant reenforcing member 32. The member 32 may constitute a relatively thin annular sheet which overlies the surface of the backing member opposed to the complemental sealing member 24 and may be formed of any material having the desired wear-resistant qualities. It may, for example, be a metal strip formed of copper, zinc, lead, Monel metal, stainless steel or nitralloy steel. The use of a copper strip for this purpose has given unusually good results, affording an excellent seal and unusual durability. The use of a sealing member of this type has been found to afford an adequate seal in spite of the fact that the actual sealing connection involves a metal to metal contact.

As stated above, an annular clamping ring 26 serves to hold the flexible sealing member in place. This clamping ring is preferably received within an annular groove in the upper part 11 of the rotor and is cut away at spaced circumferential points, as indicated at 29, to afford a suitable surface against which clamping screws 30 may rest and through which the ring 26 may be secured to the part 11.

It is to be noted that the shape of the annular clamping ring which holds the associated parts of the sealing member 25 in place within the part 11 of the bowl has an important bearing upon the rate of abrasion of the sealing surface of the member 32 by material discharge from the machine. This fact will be appreciated by a consideration of the conditions existing in connection with the modified form of clamping ring illustrated in Fig. 6 of the drawings. In accordance with this form of the invention, the clamping ring 26' projects substantially below the sealing surface, as indicated at 33 and contacts the sealing member at the outer edge of the clamping ring through a portion of the clamping ring which is directed toward the sealing member and forms a substantial angle with respect to the plane of the sealing surface as indicated at 34. In connection with the operation of a machine which utilizes a clamping ring of this type, it will be obvious that a substantial proportion of the material will flow in the direction indicated by the arrows in Fig. 6 and will impact the sealing surface of the reinforcing member at a substantial angle and therefore cause rapid erosion of this reinforcing member.

In the preferred form of clamping ring illustrated in Fig. 4, on the other hand, the flange 27 of the clamping ring is provided with a discharge-directing under surface which lies in a plane which is substantially parallel to the sealing surface of the member 32. The edge 35 of this member preferably extends slightly beyond the sealing surface and the plane of the discharge-directing surface 36 of this member forms a very small acute angle with respect to the inwardly extended plane of the sealing surface. It will be evident that this construction tends to direct the major portion of the material discharged from the bowl at a slight acute angle with respect to the sealing surface of the member 32, that the major portion of such discharge will be projected from the bowl in a plane below the sealing surface, and that the major portion of the discharged material which contacts the sealing surface will impact it at a relatively slight angle and that the erosive effect of such impact will therefore be minimized.

Modifications will be obvious to those skilled in the art and I do not therefore wish to be limited except by the scope of the sub-joined claims as interpreted in the light of the broad generic spirit of the invention.

I claim:

1. In a centrifugal machine, the combination comprising a centrifugal rotor and means for feeding to said rotor a fluid material adapted to be subjected to centrifugal treatment, said rotor including a separating chamber, a pair of separable portions extending annularly about the axis of the rotor, mounted to be movable only in an axial direction relative to each other and normally retained in abutting relationship and preventing discharge of material from said chamber, means for separating said portions to afford provision for discharge of material from said chamber, means for sealing said chamber against discharge of material between said portions when in abutting relationship, said means comprising a sealing surface on one of said portions adapted to coact with a sealing member secured to another of said portions, said sealing member comprising a flexible member extending along the surface to be sealed, and means for directing material discharged from said bowl past said sealing surface in a direction forming a slight acute angle with respect to the inwardly extended plane of the sealing surface.

2. In a centrifugal machine, the combination comprising a centrifugal rotor and means for feeding to said rotor a fluid material adapted to be subjected to centrifugal treatment, said rotor including a separating chamber, a pair of separable arcuate portions extending annularly about the axis of the rotor, mounted to be movable only in an axial direction relative to each other and normally retained in abutting relationship and preventing discharge of material from said chamber, means for separating said portions to afford provision for discharge of material from said chamber, means for sealing said chamber against discharge of material between said portions when in abutting relationship, said means comprising a sealing surface on one of said portions adapted to coact with a sealing member secured to another of said portions, said sealing member comprising a flexible member extending along the surface to be sealed, and a clamp for securing said flexible member in place within the rotor, said clamp being provided with a discharge-directing surface overlying said sealing member and extending beyond said sealing surface, the discharge-directing surface of said clamp forming a slight acute angle with respect to the inwardly extended plane of the sealing surface.

WILMER HIESTAND BATH.